United States Patent
Maffeis

(10) Patent No.: US 7,614,789 B2
(45) Date of Patent: Nov. 10, 2009

(54) STRUCTURE OF POWER DRIVEN LINEAR OPERATORS

(75) Inventor: Giuseppe Maffeis, Roncadelle (IT)

(73) Assignee: Gimatic S.p.A., Roncadelle (Brescia) (IT)

( * ) Notice: Subject to any disclaimer, the term of this patent is extended or adjusted under 35 U.S.C. 154(b) by 659 days.

(21) Appl. No.: 11/151,059

(22) Filed: Jun. 13, 2005

(65) Prior Publication Data

US 2006/0056748 A1    Mar. 16, 2006

(30) Foreign Application Priority Data

Aug. 6, 2004    (IT)    .................... BS2004U00041

(51) Int. Cl.
*F16C 29/02*    (2006.01)
(52) U.S. Cl. ............................ 384/7; 384/26
(58) Field of Classification Search .................. 384/43, 384/44, 45, 49, 50, 7, 26
See application file for complete search history.

(56) References Cited

U.S. PATENT DOCUMENTS 5,845,996 A * 12/1998 Greubel et al. ................ 384/45
6,227,708 B1 * 5/2001 Rixen et al. .................... 384/45

FOREIGN PATENT DOCUMENTS

JP        10-103310       * 4/1998

* cited by examiner

*Primary Examiner*—William C Joyce
(74) *Attorney, Agent, or Firm*—McGlew and Tuttle, P.C.

(57) ABSTRACT

A linear operators is provided including a fixed linear body, a body guided and movable alternately on the fixed body with interposition of bearings, and at least one pneumatic or electric actuator to control the alternating movements of the moving body on the fixed body. The fixed and movable bodies (11, 12), are made up of extruded profiled elements. The extruded elements are of the same width and along each of the longitudinal opposite sides of each of the extruded elements a profiled groove (22, 23) is provided so that the collateral grooves of the two joined bodies are the same, parallel, positioned on the same plane and made to receive the fixing brackets for at least one control actuator.

20 Claims, 4 Drawing Sheets

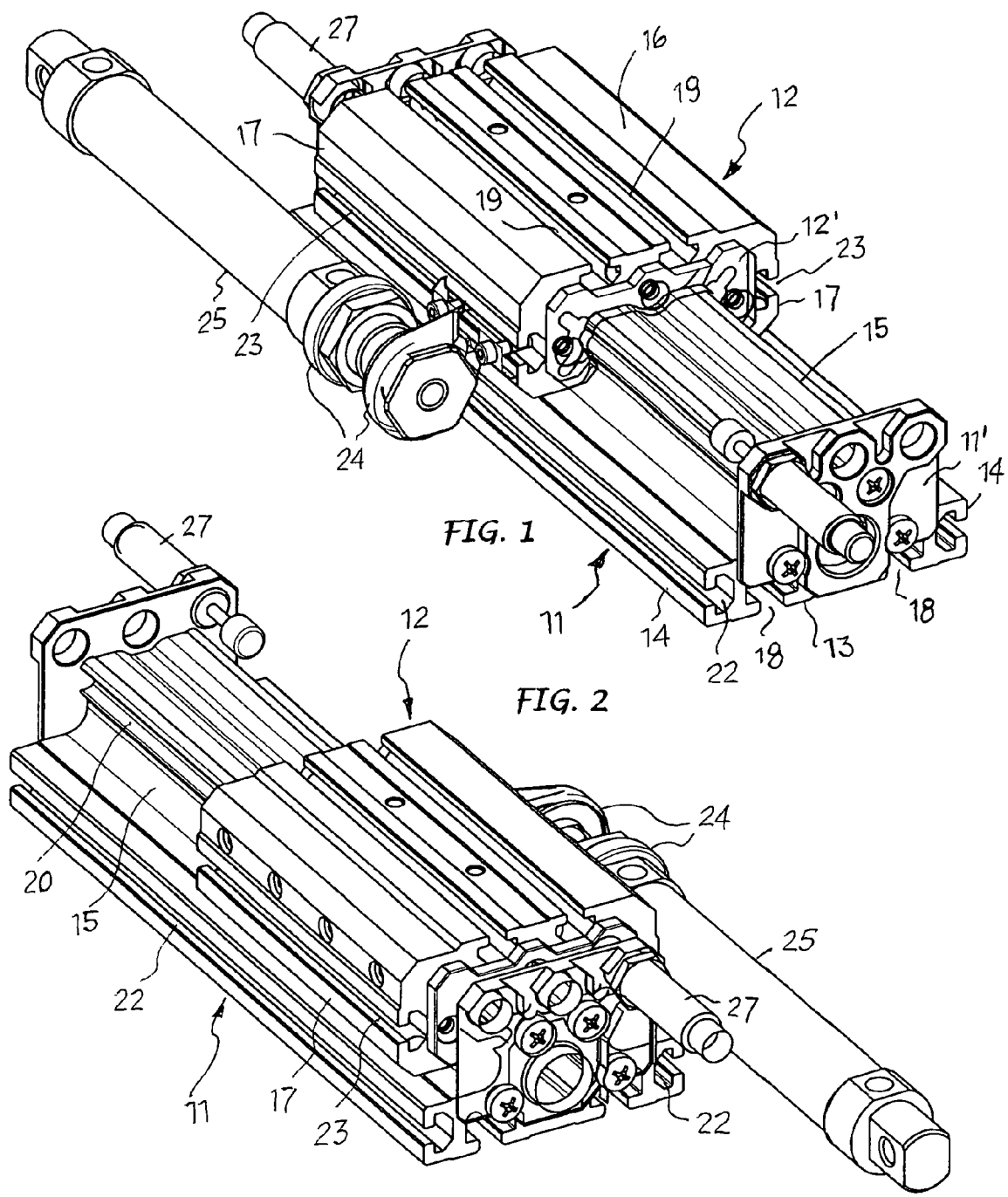

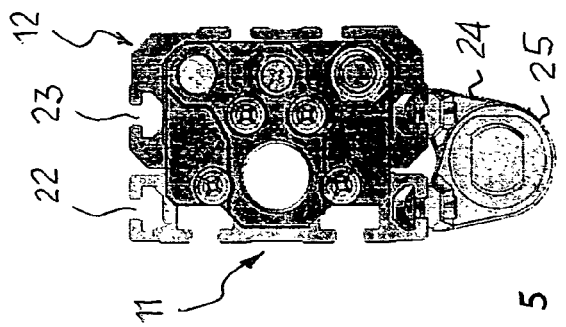
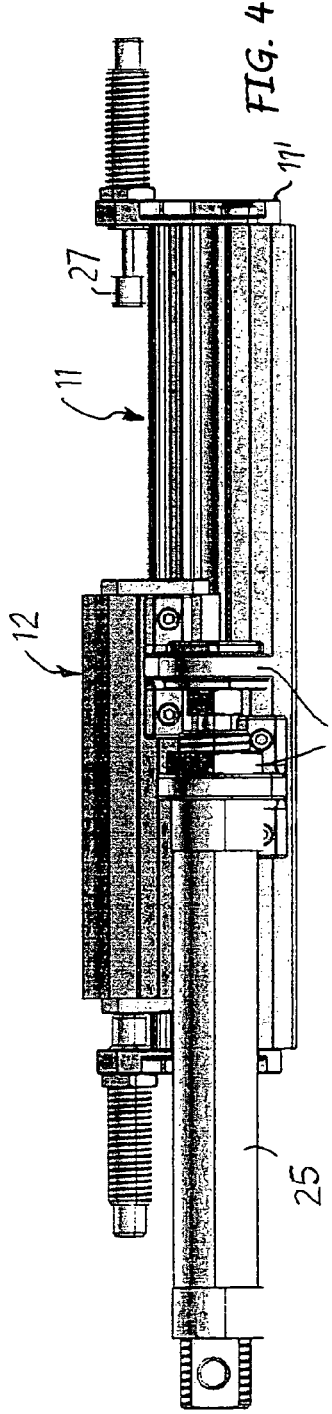
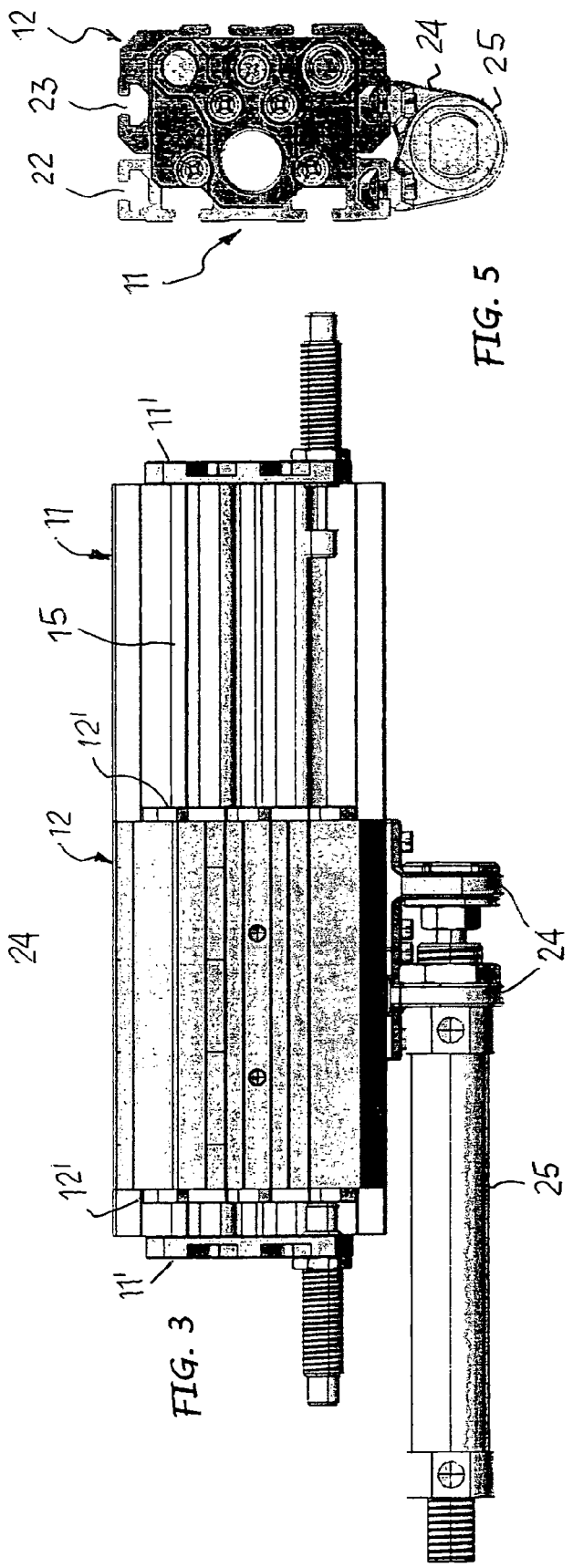

STRUCTURE OF POWER DRIVEN LINEAR OPERATORS

FIELD OF THE INVENTION

This invention concerns the type of linear operators or axis which comprise a fixed linear body, a body guided and movable alternately on the fixed one with interposition of bearings, at least one pneumatic or electric actuator to control the alternating movements of the moving body on the fixed body, means for attaching the fixed body to a stationary plane, and means for attaching to the moving body at least one member to be powered alternately.

PRIOR ART

Devices of the abovementioned type constituting basically a linear axis drive for powering/handling items, tools and like are already well known. In these devices the fixed body and the moving body or slide can be made up of extruded profiled elements, light, easy to assemble and which have the prerogatives of being compact, reliable and usable in both a horizontal and vertical position for equipping units having different configurations and performance. Such profiled bodies, and with them the operator device, have been however susceptible to improvement as regards to configuration and assembly.

OBJECT AND SUMMARY OF THE INVENTION

It is in fact one object of this invention to provide an operator or linear axis structure comprising extruded profiled elements shaped both to facilitate matching and to assist in the equipping of different devices without having to depend on additional operations, with the simple choice and addition of specific components and with the possibility of using, as control actuators, pneumatic cylinders with a rod, rodless cylinders, electric stepping motors.

This objective and consequent advantages of the invention are achieved by a linear operator structure as above described but wherein the coupled fixed and movable bodies are of the same width, and along each of the opposite longitudinal sides of each of said bodies there is a profiled groove provided so that the collateral grooves of the two joined bodies are similar, parallel and on the same perpendicular plane to the stationary plane supporting the operator.

BRIEF DESCRIPTION OF THE DRAWINGS

Further details of this invention will become more evident in the continuation of this description made in reference to the enclosed indicative and not limiting drawings, in which:

FIGS. 1 and 2 show perspective views from opposite ends of a linear operator controlled by a pneumatic cylinder with rod arrangement;

FIGS. 3, 4, and 5 are plan, side and end on views, respectively, of the operator in FIG. 1;

DETAILED DESCRIPTION OF THE INVENTION

Figure 6:
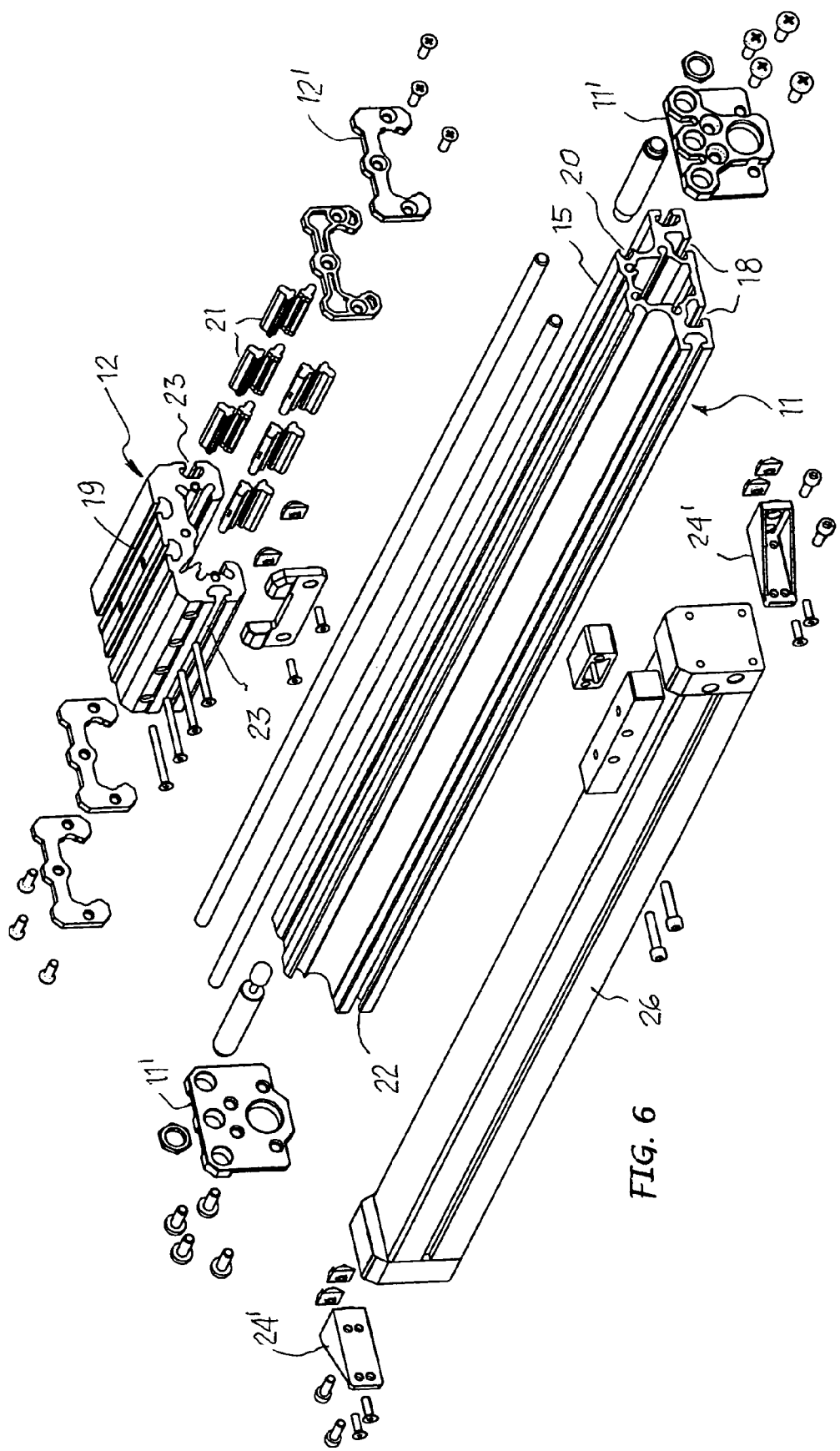
FIG. 6 is an exploded view of the components for the arrangement of a linear operator controlled by a pneumatic rodless cylinder.

As shown, the linear operator of the invention comprises two complementary bodies placed one on top of the other 11, 12, of different lengths, one being fixed and the other guided and movable alternately on the fixed one. As a reference, the longer body 11 of the two, may be considered as the fixed one and the shorter body 12 as the movable one, even if the contrary is also possible.

The fixed and movable bodies 11 and 12, can be made using extruded profiled elements, preferably aluminium or its alloys and closed by end flanges 11' and 12', respectively.

The profiled body 11 has a flat base 13, two lateral, parallel walls 14, perpendicular to the base and central top lengthwise relief 15.

The body 12 has a basically upside-down U shape cross-section with a transversal flat surface 16 and two parallel sides 17.

In the base 13 of body 11, and the same applying to the transversal plane surface of body 12, there are two longitudinal parallel grooves 18, and 19 respectively, compatible with those of other devices of the same type and with which can be associated means for fixing—not shown. Longitudinal channels 20 are provided on opposite sides of the central relief 15 of body 11, designed to act as means for coupling and guiding the body 12 with interposition of linear bearings 21.

A characteristic aspect of fixed and movable bodies 11 and 12 lies in the fact that they are equal in width. Another peculiar aspect is that along each lateral wall of body 11 is provided a profiled longitudinal groove 22, and similarly each side 17 of body 12 is provided with a profiled groove 23 the same as the one along each lateral wall of body 11.

Figures 7, 8:
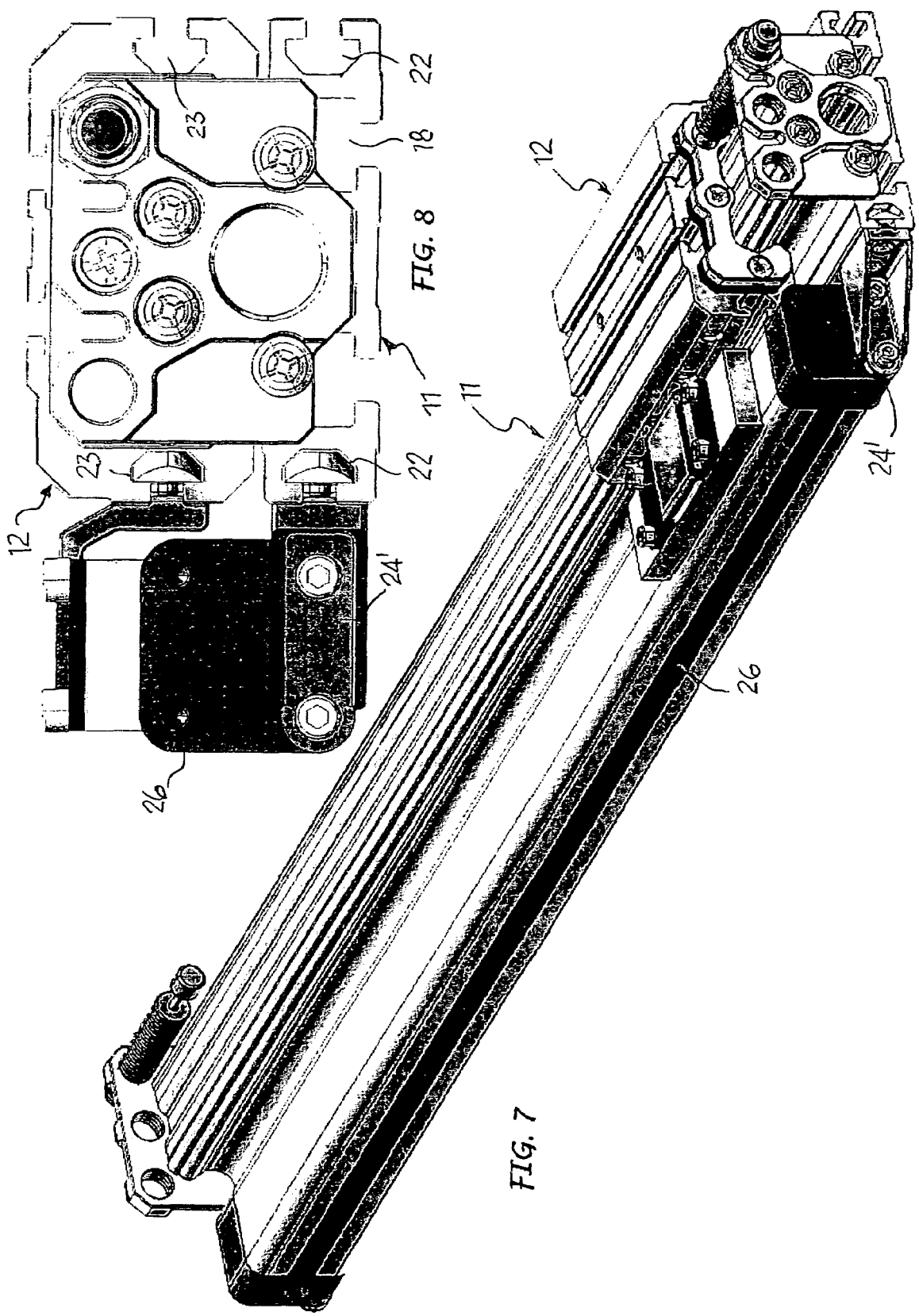
FIGS. 7 and 8 are respectively a perspective view and an end view of the operator with a rodless cylinder.

When the two bodies 11 and 12 are assembled, their collateral grooving 22, 23 are parallel and on the same perpendicular plane to the base of the unit, with the possibility of applying brackets 24 to fix additional components. The additional components can be a linear actuator comprising a pneumatic cylinder with rod 25 as in FIGS. 1-5 or a rodless cylinder 26 as in FIGS. 6-8.

In the first case, for example, the cylinder is fixed to a lateral groove 22 of body 11 by bracket 24 and the rod is fixed to a lateral groove 23 of body 12 by another bracket, the two brackets can be similar and positioned one on the contrary to the other so that the cylinder is placed symmetrically in an intermediate position between the lateral groove 22 of body 11 and the lateral groove 23 of body 12. A same bracket can also be used to equip the linear operator with an end of stroke 27, shock absorber.

In the second case, the ends of the rodless cylinder 26 are attached to a lateral groove 22 of one of the two bodies 11 by means of two similar and facing brackets 24', whereas the cursor of said cylinder is fixed to the collateral groove 23 of other body 12.

All the above having the advantageous possibility of standardising components and accessories and to be able to carry out any arrangement of the linear operators or axes without the need to carry out additional work or having to adapt the two bodies.

The invention claimed is:

1. A power driven linear operator comprising:
a guiding linear body made up of a one piece integral extruded profiled guiding element defining a guide portion with a groove or rail shape, said guide portion extending in a longitudinal direction of said guiding linear body, said extruded profiled guiding element having means for attaching said guiding linear body to a stationary surface to fix said guiding linear body extending along a stationary plane, said extruded profiled guiding element having opposite lateral sides defining a guiding linear body width dimension;
a guided movable body made up of a one piece integral extruded profiled guided element defining a guided portion with a groove or rail shape that is complementary to said guide portion to fit together complementarily in a coupled state, said guided moveable body for alternate direction movement along the guide portion, said extruded profiled guided element defining means for attaching the guided movable body to at least one member to be moved alternately, said extruded profiled guided element having a shorter length than said guiding linear body in said longitudinal direction, said extruded profiled guided element having opposite lateral sides defining a guided moveable body width dimension, said guided movable body width dimension being the same as said guiding linear body width dimension with aligned opposite lateral sides in said coupled state;

bearings interposed between said guiding linear body and said guided movable body;

a pneumatic or electric actuator connected to each of said guiding linear body and said guided movable body to actuate the alternating movements of the movable body on the guiding linear body;

a profiled groove defined by said extruded profiled guiding element and extending along each of said opposite longitudinal sides of said guiding linear body and parallel to said stationary plane; and a profiled groove defined by said extruded profiled guided element and extending along each of said opposite longitudinal sides of said guided movable body and parallel to said stationary plane, said profiled groove of said extruded profiled guiding element and said profiled groove of said extruded profiled guided element cooperating in said coupled state to provide collateral grooves that are the same shape, that are parallel and that are positioned in the same plane.

2. A power driven linear operator according to claim 1, wherein said guide portion comprises a base, two lateral, parallel walls, perpendicular to said base and a central top relief extending in said longitudinal direction, wherein said guided portion has a U shape cross-section with a transversal flat surface and two parallel sides, and wherein said profiled grooves are provided longitudinally along lateral walls along sides of said guiding linear body and said guided movable body.

3. A power driven linear operator according to claim 2, further comprising:

a first bracket anchored to a profiled groove of said guiding linear body and connected to said actuator; and a second bracket facing said first bracket an anchored to a profiled groove of said guided moveable body and connected to said actuator wherein said brackets provide the connection of said actuator to said guiding linear body and said guided moveable body.

4. A power driven linear operator according to claim 2, further comprising:

brackets for anchoring to a profiled groove of said guiding linear body and to a profiled groove of said guided moveable body for connection of a rodless cylinder to said guiding linear body and said guided moveable body.

5. A power driven linear operator according to claim 1, further comprising:

a first bracket anchored to a profiled groove of said guiding linear body and connected to said actuator; and a second bracket facing said first bracket an anchored to a profiled groove of said guided moveable body and connected to said actuator wherein said brackets provide the connection of said actuator to said guiding linear body and said guided moveable body.

6. A power driven linear operator according to claim 5, further comprising:

another bracket for anchoring to either of a profiled groove of said guiding linear body or to a profiled groove of said guided moveable body for connection of a device to one of said guiding linear body and said guided moveable body.

7. A power driven linear operator according to claim 5, wherein said actuator is a pneumatic cylinder with a rod with said rod connected to one of said first bracket and said second bracket and said cylinder connected to the other of said first bracket and said second bracket.

8. A power driven linear operator according to claim 1, further comprising:

brackets for anchoring to a profiled groove of said guiding linear body and to a profiled groove of said guided moveable body for connection of a rodless cylinder to said guiding linear body and said guided moveable body.

9. A power driven linear operator according to claim 1, wherein said guiding linear body and said guided moveable body are each closed by end flanges and have longitudinal slots along the respective base and transversal surface.

10. A power driven linear operator comprising:

a guiding linear body made up of a one piece integral extruded profiled guiding element defining a guide portion with a groove or rail shape, said guide portion extending in a longitudinal direction of said guiding linear body, said guiding linear body having means for attaching said guiding linear body to a stationary surface to provide said guiding linear body extending along a stationary plane, said extruded profiled guiding element having opposite lateral sides defining a guiding linear body width dimension;

a guided movable body made up of a one piece integral extruded profiled guided element defining a guided portion with a groove or rail shape that is complementary to said guide portion to fit together complementarily in a coupled state, said guided moveable body for alternate direction movement along the guide portion, said extruded profiled guided element defining means for attaching the guided movable body to at least one member to be moved alternately, said extruded profiled guided element opposite lateral sides defining a guided moveable body width dimension, said guided movable body width dimension being the same as said guiding linear body width dimension with aligned opposite lateral sides in said coupled state;

bearings interposed between said guiding linear body and said guided movable body;

a pneumatic or electric actuator connected to each of said guiding linear body and said guided movable body to actuate the alternating movements of said guided movable body on the guiding linear body;

a profiled groove defined by said extruded profiled guiding element and extending along each of said opposite longitudinal sides of said guiding linear body;

a profiled groove defined by said extruded profiled guided element and extending along each of said opposite longitudinal sides of said guided movable body, said profiled groove of said extruded profiled guiding element and said profiled groove of said extruded profiled guided element cooperating in said coupled state to provide collateral grooves that are the same shape, that are parallel and that are positioned in the same plane;

a first bracket anchored to a profiled groove of said guiding linear body and connected to said actuator; and a second bracket anchored to a profiled groove of said guided moveable body and connected to said actuator wherein said brackets provide the connection of said actuator to said guiding linear body and said guided moveable body.

11. A power driven linear operator according to claim 10, wherein said guide portion comprises a base, two lateral, parallel walls, perpendicular to said base and a central top relief extending in said longitudinal direction, wherein said guided portion has a U shape cross-section with a transversal flat surface and two parallel sides, and wherein said profiled grooves are provided longitudinally along lateral walls along sides of said guiding linear body and said guided movable body.

12. A power driven linear operator according to claim 11, further comprising:
    another bracket for anchoring to either of a profiled groove of said guiding linear body or to a profiled groove of said guided moveable body for connection of a device to one of said guiding linear body and said guided moveable body.

13. A power driven linear operator according to claim 11, further comprising:
    further brackets for anchoring to either of a profiled groove of said guiding linear body or to a profiled groove of said guided moveable body for connection a rodless cylinder to said guiding linear body and said guided moveable body.

14. A power driven linear operator according to claim 10, further comprising:
    brackets for anchoring to a profiled groove of said guiding linear body and to a profiled groove of said guided moveable body for connection of a rodless cylinder to said guiding linear body and said guided moveable body.

15. A power driven linear operator according to claim 10, wherein said guiding linear body and said guided moveable body are each closed by end flanges and have longitudinal slots along the respective base and transversal surface.

16. A power driven linear operator according to claim 10, wherein said actuator is a pneumatic cylinder with a rod with said rod connected to one of said first bracket and said second bracket and said cylinder connected to the other of said first bracket and said second bracket.

17. A power driven linear operator comprising:
    a guiding linear body comprising a one piece integral extruded profiled guiding element including a guide portion having a groove or rail shape, said guide portion extending in a longitudinal direction of said guiding linear body, said guiding linear body having means for attaching said guiding linear body to a stationary surface, said one piece integral extruded profiled guiding element having opposite lateral sides defining a guiding linear body width dimension;
    a guided movable body comprising a one piece integral extruded profiled guided element with a guided portion with a groove or rail shape that is complementary to said guide portion to fit together complementarily in a coupled state, said guided moveable body for alternate direction movement along said guide portion, said one piece integral extruded profiled guided element having means for attaching to the movable body at least one member to be moved alternately, said guided movable body having a shorter length than said guiding linear body in said longitudinal direction, said one piece integral extruded profiled guided element having opposite lateral sides defining a guided moveable body width dimension, said guided movable body width dimension being the same as said guiding linear body width dimension with aligned opposite lateral sides in said coupled state;
    bearings interposed between said guide portion and said guided portion;
    a profiled groove defined by said one piece extruded profiled guiding element and extending along each of said opposite longitudinal sides of said guiding linear body;
    a profiled groove defined by said one piece extruded profiled guiding element and extending along each of said opposite longitudinal sides of said guided movable body;
    a pneumatic or electric actuator;
    a first bracket anchored to one said profiled groove of said guiding linear body and connected to said actuator; and
    a second bracket anchored to one said profiled groove of said guided moveable body and connected to said actuator whereby the alternating movements of the movable body on the guiding linear body are actuated.

18. A power driven linear operator according to claim 17, wherein said guide portion comprises a base, two lateral, parallel walls, perpendicular to said base and a central top relief extending in said longitudinal direction, wherein said guided portion has a U shape cross-section with a transversal flat surface and two parallel sides, and wherein said profiled grooves are provided longitudinally along lateral walls along sides of said guiding linear body and said guided movable body.

19. A power driven linear operator according to claim 17, further comprising:
    another bracket for anchoring to either profiled groove of said guiding linear body or to either profiled groove of said guided moveable body for connection of a device to one of said guiding linear body and said guided moveable body.

20. A power driven linear operator according to claim 17, wherein said actuator is a pneumatic cylinder with a rod with said rod connected to one of said first bracket and said second bracket and said cylinder connected to the other of said first bracket and said second bracket.

* * * * *